(12) United States Patent
Bales et al.

(10) Patent No.: US 9,137,132 B1
(45) Date of Patent: Sep. 15, 2015

(54) ANTENNA MONITORING SYSTEM AND METHOD TO MONITOR A DISTRIBUTED ANTENNA SYSTEM

(71) Applicant: Sprint Communications Company L.P., Overland Park, KS (US)

(72) Inventors: Stephen R. Bales, Lee's Summit, MO (US); Maneesh Gauba, Overland Park, KS (US); Kaushik Goswami, Herndon, VA (US); Paul Jacob Sterchi, Lawrenceburg, IN (US)

(73) Assignee: Sprint Communications Company L.P., Overland Park, KS (US)

( * ) Notice: Subject to any disclaimer, the term of this patent is extended or adjusted under 35 U.S.C. 154(b) by 97 days.

(21) Appl. No.: 14/036,145

(22) Filed: Sep. 25, 2013

(51) Int. Cl.
*H04L 12/26* (2006.01)

(52) U.S. Cl.
CPC .................................. *H04L 43/0888* (2013.01)

(58) Field of Classification Search
CPC ............................ H04L 43/0888; H04L 43/12
See application file for complete search history.

(56) References Cited

U.S. PATENT DOCUMENTS

| 6,799,025 B1 * | 9/2004 | Hoshino | 455/276.1 |
| 8,194,597 B2 | 6/2012 | Feder et al. | |
| 2002/0146990 A1 * | 10/2002 | Riddle | 455/115 |

\* cited by examiner

*Primary Examiner* — Mohammad Anwar (57) ABSTRACT

An antenna monitoring system in one example embodiment includes a plurality of analog-to-digital (A/D) converters configured to receive a plurality of tapped antenna signals and generate a plurality of digitized antenna signals, and an antenna monitor coupled to the plurality of A/D converters and coupled to a Base Transceiver Station (BTS) of the distributed antenna system, with the antenna monitor comprising a storage system configured to store an antenna monitor routine and a plurality of per-antenna information, a communication transceiver configured to transfer the plurality of per-antenna information, and a processing system configured to receive the plurality of digitized antenna signals from the plurality of A/D converters, reverse-process the plurality of digitized antenna signals to generate the plurality of per-antenna information, and feed the plurality of per-antenna information back to the BTS, with the BTS using the plurality of per-antenna information to monitor the plurality of antenna sub-systems.

20 Claims, 4 Drawing Sheets

ANTENNA MONITORING SYSTEM AND METHOD TO MONITOR A DISTRIBUTED ANTENNA SYSTEM

TECHNICAL BACKGROUND

Communications services are commonly required in buildings, including in multi-level buildings having a plurality of levels. In large buildings, and even in buildings having only a few levels, an antenna sub-system on one level or floor may not be able to reliably communicate with electronic devices on other levels, even when on immediately adjacent levels. Communications services being provided to a large, multi-level building often require additional hardware devices in order to provide communications to all levels or floors.

A communication system inside a multi-level building is coupled to an external communication link. The communication system is further coupled to a bus or signal conductor system that extends to all levels of the multi-level building. A plurality of antenna sub-systems are coupled to the bus or signal conductor system, with each antenna sub-system of the plurality of antenna sub-systems being located on a separate level of the building. By installing an antenna sub-system on each level, reliable communications can be generated for all users and all user devices in the multi-level building, regardless how far they are from the communication equipment that is coupled to the external communication link.

A Base Transceiver Station (BTS) is coupled to the external communication link. The BTS exchanges communications between the multi-level building and the external communication link, wherein the external communication link may further connect to one or more communication networks or communication systems. The BTS creates an internal digital data stream from the incoming communications and a Remote Radio Unit (RRU) receives the digital data stream from the BTS. The RRU processes the plurality of sub-streams and creates a plurality of analog sub-streams that are ready for emission from the plurality of antenna sub-systems. The processing therefore includes addressing and/or separating the data to form the plurality of sub-streams, wherein the RRU distributes the plurality of sub-streams to the bus or signal conductor system and to the plurality of antenna sub-systems. The processing may also include buffering and isolation of the individual sub-streams and may include amplification and signal conditioning of the individual sub-streams. As a result, the RRU can control the signal power at each antenna sub-system.

The BTS has the capability and the programming to manage the exchange of communications between the external communication link and the distributed antenna system. However, because of the RRU positioned between the BTS and the distributed antenna network, the BTS is not aware of the data and/or signals that are actually being emitted by the plurality of antenna sub-systems. In addition, because of the RRU, the BTS is not aware of the data and/or signals that are actually being received by the RRU from the plurality of antenna sub-systems.

Overview

Systems and methods for monitoring a distributed antenna system are provided herein. In one example, an antenna monitoring system configured to monitor a distributed antenna system in a multi-level building includes a plurality of analog-to-digital (A/D) converters configured to receive a corresponding plurality of tapped antenna signals from a plurality of antenna sub-systems comprising the distributed antenna system and generate a plurality of digitized antenna signals, and an antenna monitor coupled to the plurality of A/D converters and coupled to a Base Transceiver Station (BTS) of the distributed antenna system, with the antenna monitor comprising a storage system configured to store an antenna monitor routine and a plurality of per-antenna information, a communication transceiver configured to transfer the plurality of per-antenna information to the BTS, and a processing system coupled to the storage system and the communication transceiver, with the processing system configured to receive the plurality of digitized antenna signals from the plurality of A/D converters, reverse-process the plurality of digitized antenna signals to generate the plurality of per-antenna information, and feed the plurality of per-antenna information back to the BTS, with the BTS using the plurality of per-antenna information to monitor the plurality of antenna sub-systems.

In an example of an antenna monitoring method configured to monitor a distributed antenna system, the method includes tapping an antenna signal at each antenna sub-system of a plurality of antenna sub-systems comprising the distributed antenna system to generate a plurality of tapped antenna signals, digitizing the plurality of tapped antenna signal to generate a plurality of digitized antenna signals, reverse-processing the plurality of digitized antenna signals to generate a plurality of per-antenna information, and feeding the plurality of per-antenna information back to the distributed antenna system, with the distributed antenna system using the plurality of per-antenna information to monitor the plurality of antenna sub-systems.

In an example of one or more computer-readable storage media having program instructions stored thereon for monitoring a distributed antenna system that, when executed by a processing system, directs the processing system to at least receive a plurality of digitized antenna signals, reverse-process the plurality of digitized antenna signals to generate a plurality of per-antenna information, and feed the plurality of per-antenna information back to the BTS, with the BTS using the plurality of per-antenna information to monitor the plurality of antenna sub-systems.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
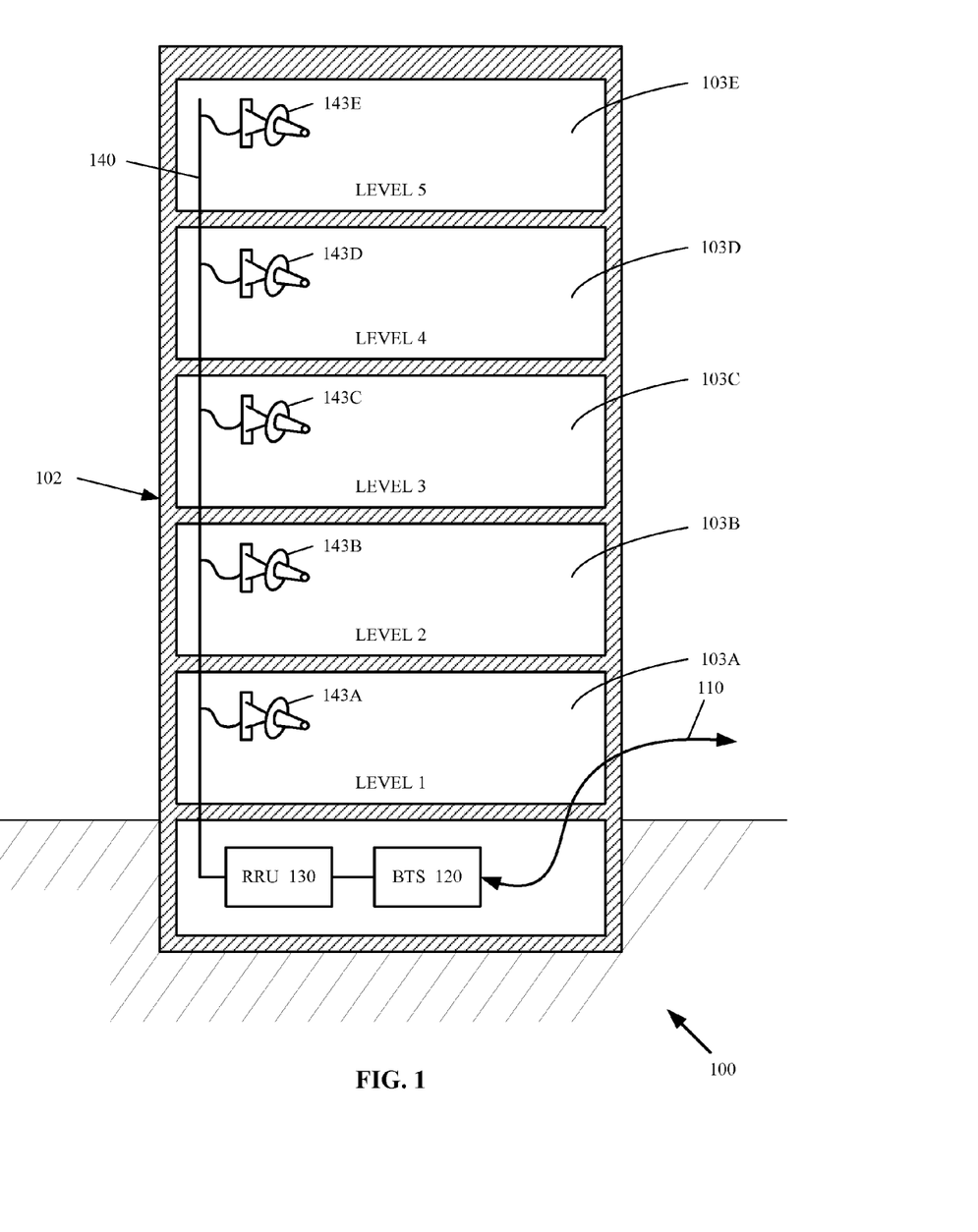
FIG. 1 shows a multi-level building including a distributed antenna system.

FIG. 1 shows a multi-level building 102 including a distributed antenna system 100. The distributed antenna system 100 includes an external communication link 110, a base transceiver station (BTS) 120 coupled to the external communication link 110, a Remote Radio Unit (RRU) 130 coupled to the BTS 120, an antenna bus 140 coupled to the RRU 130, and a plurality of antenna sub-systems 143A-143E each coupled to the antenna bus 140.

The multi-level building 102 includes a plurality of levels 103A-103E, where a single antenna system may not function well for the multi-level building 102 as a whole. Therefore, the plurality of antenna sub-systems 143A-143E are deployed in the multi-level building 102, with each antenna sub-system 143 being located on a separate level 103 of the multi-level building 102. Each antenna sub-system 143 is configured to send and receive communications for the corresponding building level 103. The distributed antenna system 100 therefore ensures that each level 103 of the multi-level building 102 can send and receive signals, wherein signals may not travel well between levels 103.

The multi-level building 102 in some examples comprises an apartment building or office building, wherein the distributed antenna system 100 includes antenna sub-systems 143 deployed on each building level 103 to send and receive wireless digital signals to occupants of each floor. The antenna bus 140 extends from the RRU 130 to each building level 103 and to the antenna sub-system situated on that level 103. The RRU 130 distributes antenna-ready signals to each antenna sub-system 143 via the antenna bus 140.

The antenna bus 140 in one example comprises a coaxial cable extending to every antenna sub-system of the plurality of antenna sub-systems 143. The antenna bus 140 in another example comprises a plurality of coaxial cables, wherein each coaxial cable extends to a corresponding antenna sub-system of the plurality of antenna sub-systems 143. It should be understood, however, that other conductors or signal distribution elements are contemplated for the antenna bus 140 and are within the scope of the description and claims.

The external communication link 110 comprises any suitable wired or wireless network and can include a variety of network components. The external communication link 110 is coupled to one or more external devices, including devices that communicate network signals and devices that generate or provide network signals, for example.

The BTS 120 exchanges communications between the external communication link 110 and the distributed antenna system 100. The BTS 120 can therefore exchange communications between the distributed antenna network 100 and various network devices (not shown for clarity).

In a receive direction, the network communication signal is received by the BTS 120 over the external communication link 110. The BTS 120 processes the network communication signal and generates a digital transmission signal from the network communication signal. The digital transmission signal comprises at least some of the messages received in the network communication signal. The BTS 120 transfers the digital transmission signal to the RRU 130. The RRU 130 processes the digital transmission signal and generates a plurality of analog transmission signals. The plurality of analog transmission signals include appropriate power levels, timing, and protocol(s) for antenna emission in the distributed antenna network 100. The RRU 130 places the plurality of analog transmission signals on the antenna bus 140, wherein the antenna bus 140 distributes each analog transmission signal of the plurality of analog transmission signals to an individual antenna sub-system 143.

Likewise, the BTS 120 can transfer communications from the distributed antenna system 100 to the external communication link 110. Signals received in an antenna sub-system 143 are transferred to and processed in the RRU 130 to generate received digital information. The RRU 130 passes the received digital information to the BTS 120. The BTS 120 places the received digital information on the external communication link 110 for transmission to an external device or devices.

Figure 2:
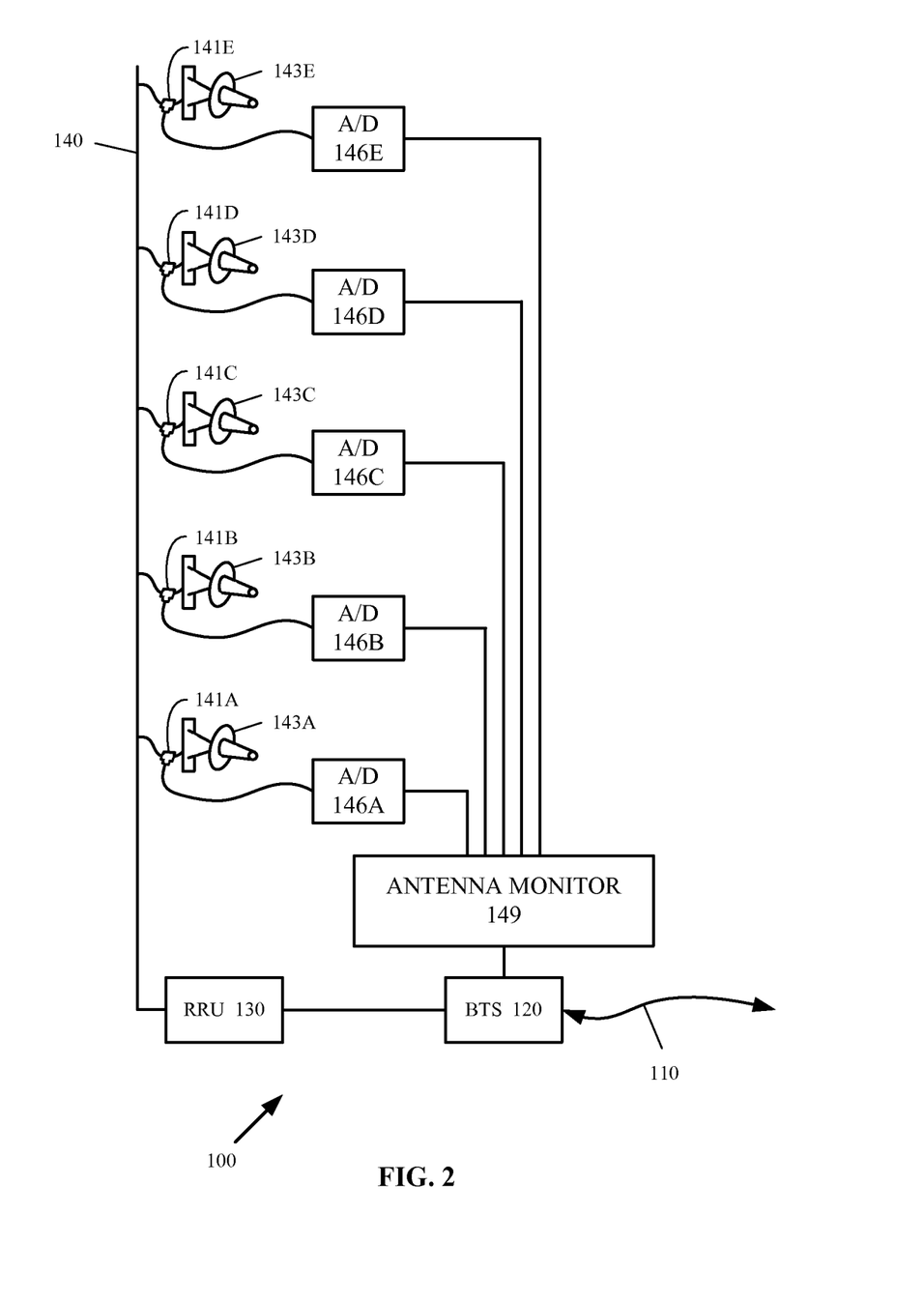
FIG. 2 shows an exemplary distributed antenna system.

FIG. 2 shows an exemplary distributed antenna system 100. The multi-level building 102 is omitted from this figure for simplicity. The distributed antenna system 100 in this example further comprises a plurality of taps 141A-141E and a plurality of analog-to-digital (A/D) converters 146A-146E that are coupled to the plurality of antenna sub-systems 143A-143E via the plurality of taps 141A-141E. In some examples, the plurality of taps 141A-141E and the plurality of A/D converters 146 are positioned as close to the plurality of antenna sub-systems 143A-143E as possible in order to minimize signal loss. The plurality of taps 141 pickup both incoming and outgoing signals for the particular antenna sub-system. The plurality of taps 141 pull off signals that are the same as the signals that are transmitted and received by the RRU 130.

The plurality of antenna sub-systems 143A-143E are further coupled to an antenna monitor 149. The antenna monitor 149 is coupled to the BTS 120. The antenna monitor 149 provides per-antenna information to the BTS 120 for each antenna sub-system 143.

In some examples, the plurality of A/D converters 146 comprise independent components that are coupled to the antenna monitor 149. Alternatively, the plurality of A/D converters 146 can be integrated into the antenna monitor 149. In yet another alternative, both the plurality of A/D converters 146 and the antenna monitor 149 can be integrated into the BTS 120.

The antenna monitor 149 in one example receives a plurality of digitized antenna signals from the plurality of A/D converters 146, reverse-processes the plurality of digitized antenna signals to generate a plurality of per-antenna information, and feeds the plurality of per-antenna information back to the BTS 120, with the BTS 120 using the plurality of per-antenna information to monitor each antenna sub-system 143 of the distributed antenna system 100.

Figure 3:
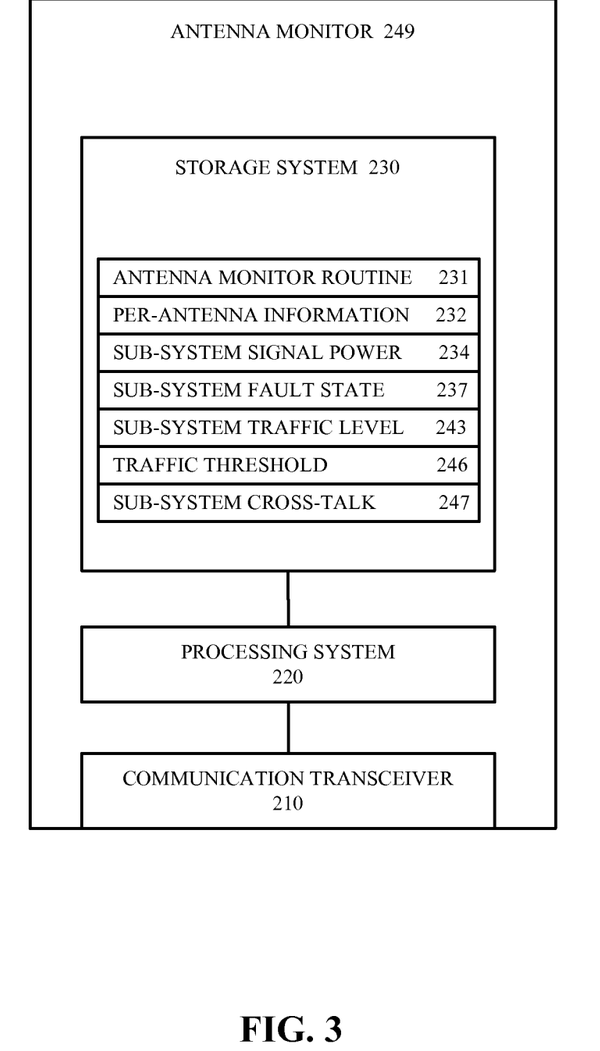
FIG. 3 shows an exemplary antenna monitor of the distributed antenna system.

FIG. 3 shows an exemplary antenna monitor 249 of the distributed antenna system 100. The antenna monitor 249 of FIG. 3 maybe the same as or different from the antenna monitor 149 of FIG. 2. The antenna monitor 249 includes a communication transceiver 210, a storage system 230, and a processing system 220 coupled to the communication transceiver 210 and the storage system 230. The storage system in the example stores an antenna monitor routine 231, per-antenna information 232, a sub-system signal power 234, a sub-system fault state 237, a sub-system traffic level 243, a traffic threshold 246, and a sub-system cross-talk 247.

The communication transceiver 210 is configured to receive a plurality of digital antenna signals from the plurality of A/D converters 146. The communication transceiver 210 is further configured to transfer a plurality of per-antenna information to the BTS 120.

The antenna monitor routine 231 processes the received plurality of digital antenna signals and generates the plurality of per-antenna information 232 from the plurality of digital antenna signals. The antenna monitor routine 231 transfers the plurality of per-antenna information 232 to the BTS 120. The BTS 120 can use the per-antenna information to control the distribution of communications in the distributed antenna system 100.

The per-antenna information 232 comprises a plurality of per-antenna information corresponding to the plurality of digital antenna signals. The per-antenna information 232 comprises information similar to information transferred from the BTS 120 to the RRU 130 (i.e., information to be emitted by the distributed antenna system 100) and/or similar to information transferred from the RRU 130 to the BTS 120 (i.e., information received by the distributed antenna system 100).

The sub-system signal power 234 stores a signal power for one or more antenna sub-systems. The sub-system signal power 234 can comprise a signal power of transmitted and/or received signals for the corresponding antenna sub-system. The sub-system signal power 234 can be used to determine if adjustments need to be made to a particular antenna sub-system or sub-systems. In addition, or alternatively, the sub-system signal power 234 can store a signal-to-noise (S/N) ratio or other power quantification values for a signal or signals received in an antenna sub-system from devices on the corresponding building level. The sub-system signal power 234 can store signal power values for each antenna sub-system in some examples.

The sub-system fault state 237 stores a fault state for one or more antenna sub-systems. The sub-system fault state 237 can comprise a true or false fault state for the corresponding antenna sub-system. The sub-system fault state 237 can comprise an indication of improper operation, such as an antenna sub-system not receiving a signal or an antenna sub-system not transmitting a signal. The sub-system fault state 237 can be used to determine if a particular antenna sub-system is operating properly. The sub-system fault state 237 can store fault states for each antenna sub-system in some examples.

The sub-system traffic level 243 stores a traffic level for one or more antenna sub-systems. The sub-system traffic level 243 comprises a traffic level in an antenna sub-system. The sub-system traffic level 243 can comprise a traffic level value for the corresponding antenna sub-system. The sub-system traffic level 243 can be used to determine if a particular antenna sub-system or sub-systems is experiencing heavy traffic levels, i.e., if the particular antenna sub-system or sub-systems are suffering traffic congestion. The sub-system traffic level 243 can store traffic level values for each antenna sub-system in some examples.

The sub-system traffic level 243 can store a number of messages being exchanged by a particular antenna sub-system in some examples. The sub-system traffic level 243 can store a number of users on the building level of the particular antenna sub-system in some examples. The sub-system traffic level 243 can store a number of Media Access Layer (MAC) IDs for the building level of the particular antenna sub-system in some examples.

The traffic threshold 246 comprises a predetermined traffic threshold stored for use in traffic level comparisons. The sub-system traffic level 243 for a particular antenna sub-system can be compared to the traffic threshold 246. If the sub-system traffic level 243 does not exceed the traffic threshold 246, then the traffic level in the particular antenna sub-system can be determined to be acceptable and no action is taken. However, if the sub-system traffic level 243 exceeds the traffic threshold 246, then the particular antenna sub-system is determined to be experiencing heavy traffic levels and some manner of traffic mitigation can be implemented. The traffic mitigation can include scheduling of traffic in some examples. The traffic mitigation can include re-prioritizing or shifting of traffic in some examples.

The sub-system cross-talk 247 stores a quantification of cross-talk being experienced in a particular antenna sub-system, wherein the particular antenna sub-system is receiving cross-talk from one or more of the other antenna sub-systems. The sub-system cross-talk 247 can be used in the distributed antenna system 100 to reduce the transmission signal power in the problem antenna sub-systems in some examples and can thereby reduce or eliminate cross-talk.

In some examples, some or all of the sub-system signal power 234, the sub-system fault state 237, the sub-system traffic level 243, the traffic threshold 246, and the sub-system cross-talk 247 may be incorporated into the per-antenna information 232. Alternatively, in other examples the per-antenna information 232 comprises only the raw communication data, wherein various sub-system characteristics can be extracted from the per-antenna information 232 with appropriate processing. In yet another alternative, the per-antenna information 232 may include the raw data and the above-listed data items, wherein the raw data may be used for generating other or additional data items in addition to the sub-system signal power 234, the sub-system fault state 237, the sub-system traffic level 243, the traffic threshold 246, and the sub-system cross-talk 247.

The antenna monitor routine 231 comprises operating instructions that configure the processing system 220 when the antenna monitor routine 231 is executed by the processing system 220. The antenna monitor routine 231, when executed by the processing system 220, may direct the antenna monitor 249 to receive a plurality of digitized antenna signals from a plurality of A/D converters, reverse-process the plurality of digitized antenna signals to generate a plurality of per-antenna information, and feed the plurality of per-antenna information back to the BTS, with the BTS using the plurality of per-antenna information to monitor each antenna sub-system of the distributed antenna system.

Figure 4:
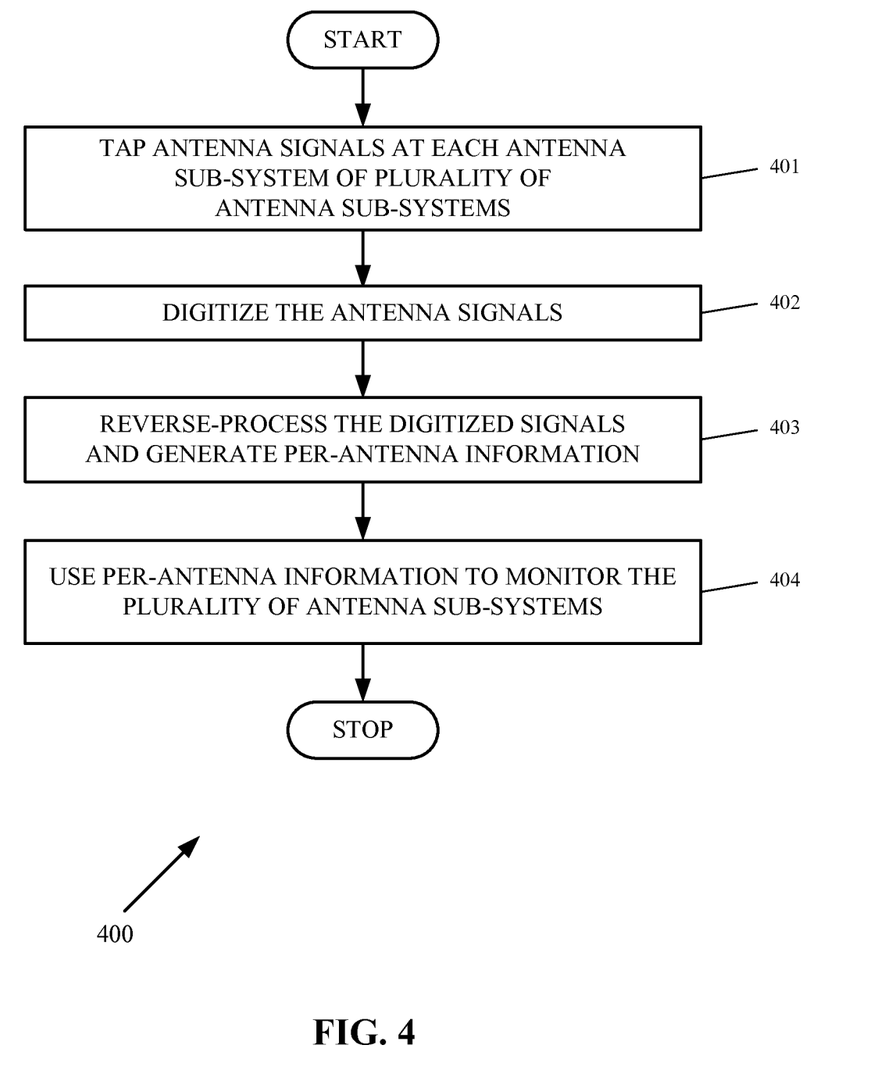
FIG. 4 is a flowchart of an exemplary antenna monitoring method for monitoring a distributed antenna system in a multi-level building.

FIG. 4 is a flowchart 400 of an exemplary antenna monitoring method for monitoring a distributed antenna system in a multi-level building. The distributed antenna system can include an antenna sub-system located on each level or floor of the multi-level building. In step 401, antenna signals at each antenna sub-system are tapped. The antenna signals comprise analog signals that are emitted by the antenna sub-systems. Each antenna sub-system is tapped, with the tap being as close as possible to the antenna sub-system. The tap picks up both incoming and outgoing signals for the particular antenna sub-system. The tap pulls off signals that are the same as the signals that are transmitted and received by the RRU 130.

In step 402, the tapped signals are digitized to create a plurality of digital antenna signals. In some examples, the digitization is performed by an analog-to-digital (A/D) converter. In some examples, the plurality of A/D converters are located in or near to each antenna tap, wherein the A/D converters are located as close to respective antennas as possible in order to minimize signal loss due to the tapping.

In step 403, the plurality of digitized antenna signals are reverse-processed in an antenna monitor system to generate per-antenna information. The reverse-processing comprises a substantially complementary processing of the processing performed by the BTS on the network signal feed in some examples. The reverse processing separates incoming and outgoing signals. The reverse processing separates out individual messages, along with included data. The individual messages comprise packetized communications. The messages comprise packetized messages in some examples. The messages can comprise messages in any suitable digital communications protocol such as any version of Internet Protocol (IP), for example.

In step 404, the per-antenna information is fed to the BTS and used to control the communications being exchanged by the distributed antenna system. The per-antenna information is used by the BTS to determine how well each antenna sub-system is performing. The per-antenna information is used by the BTS to control the communication information passed to the RRU by the BTS, to control operation of the RRU by the BTS, or both.

The per-antenna information can be used to determine a received signal power of signals being received by each antenna sub-system of the distributed antenna system. The per-antenna information can be used to determine a received signal-to-noise (S/N) ratio of signals being received by each antenna sub-system. The per-antenna information can be used to control an emitted signal power being output by each antenna sub-system (where some levels of the multi-level building may require more signal power than other levels). The per-antenna information can be used to detect a fault in each antenna sub-system. The per-antenna information can be used to detect that each antenna sub-system is receiving signals from the RRU. The per-antenna information can be used to detect that each antenna sub-system is receiving signals from a corresponding level of the multi-level building. The per-antenna information can be used to detect cross-talk from other antenna sub-systems in other levels of the multi-level building.

The per-antenna information can be used to monitor a traffic level in each antenna sub-system of the plurality of antenna sub-systems. A traffic level for a particular antenna sub-system can be compared to a predetermined traffic threshold. If the sub-system traffic level does not exceed the predetermined traffic threshold, then the traffic level in the particular antenna sub-system can be determined to be acceptable and no action is taken. However, if the sub-system traffic level exceeds the predetermined traffic threshold, then the particular antenna sub-system is determined to be experiencing heavy traffic levels and some manner of traffic mitigation can be implemented. The traffic mitigation can include scheduling of traffic. The traffic mitigation can include re-prioritizing or shifting of traffic.

The processing system 220 can comprise one or more microprocessors and other circuitry that retrieves and executes the antenna monitor routine 231 from the storage system 230. The processing system 220 can be implemented within a single processing device but can also be distributed across multiple processing devices or sub-systems that cooperate in executing program instructions. Examples of the processing system 220 include general purpose central processing units, application specific processors, and logic devices, as well as any other type of processing device, combinations, or variations thereof.

The communication transceiver 210 is configured to exchange signals and communications. The communication transceiver 210 may be coupled to the plurality of A/D converters 146 and to the BTS 120. The communication transceiver 210 may communicate with the BTS 120 in a wired or wireless fashion.

The storage system 230 can comprise any computer readable storage media readable by the processing system 220 and capable of storing the antenna monitor routine 231. The storage system 230 can include volatile and nonvolatile, removable and non-removable media implemented in any method or technology for storage of information, such as computer readable instructions, data structures, program modules, or other data.

In addition to storage media, in some implementations the storage system 230 can also include communication media over which the antenna monitor routine 231 can be communicated. The storage system 230 can be implemented as a single storage device but can also be implemented across multiple storage devices or sub-systems co-located or distributed relative to each other. The storage system 230 can comprise additional elements, such as a controller, capable of communicating with the processing system 220. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The antenna monitor routine 231 can include additional processes, programs, or components, such as operating system software, database software, or application software. The antenna monitor routine 231 can also comprise firmware or some other form of machine-readable processing instructions executable by the processing system 220.

In general, the antenna monitor routine 231 can, when loaded into the processing system 220 and executed, transform the processing system 220 into a special-purpose computing system configured to receive a plurality of antenna signals, generate a corresponding plurality of per-antenna information, and feed the plurality of per-antenna information back into the system, among other operations, wherein the plurality of per-antenna information is used to monitor each antenna subsystem 143 of the distributed antenna system 100. Encoding the antenna monitor routine 231 on the storage system 230 can transform the physical structure of the storage system 230. The specific transformation of the physical structure can depend on various factors in different implementations of this description. Examples of such factors can include, but are not limited to the technology used to implement the storage media of the storage system 230 and whether the computer-storage media are characterized as primary or secondary storage. For example, if the computer-storage media are implemented as semiconductor-based memory, the antenna monitor routine 231 can transform the physical state of the semiconductor memory when the program is encoded therein. For example, the antenna monitor routine 231 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

The antenna bus 140 comprises a physical, logical, or virtual communication link, capable of communicating data, control signals, and communications, along with other information. In this example, the antenna bus 140 includes RF distribution elements, such as wires, circuit board traces, or other elements. In some examples, portions of the antenna bus 140 are included within the elements of the RRU 130. In other examples, the antenna bus 140 uses various communication media, such as metallic or other electrical conductors, optical fiber, or other signal propagation path, including combinations thereof.

The BTS 120 provides wireless communication access for wireless communication devices that may be located within the coverage area of the BTS 120. The BTS 120 could include RF communication and control circuitry and antennas, and includes wireless communications equipment capable of communicating with and providing communication service to wireless communication devices.

The communications exchanged between the occupants of the multi-level building 102 and the external link 110 may include but not limited to, a cell phone call, an attempt to connect to the system, an attempt to make a Wi-Fi connection, GPS information, a search initiated on the wireless communication device, application download, etc.

Wireless network protocols that may be utilized by the RRU 130 and the distributed antenna system 100 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or other wireless network protocol.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. An antenna monitoring system configured to monitor a distributed antenna system, comprising:
   a plurality of analog-to-digital (A/D) converters configured to receive a corresponding plurality of tapped Radio Frequency (RF) antenna signals from a plurality of antenna sub-systems comprising the distributed antenna system and generate a plurality of RF digitized antenna signals from the plurality of A/D converters; and
   an antenna monitor coupled to the plurality of A/D converters and coupled to a Base Transceiver Station (BTS) of the distributed antenna system, with the antenna monitor comprising:
      a storage system configured to store an antenna monitor routine and a plurality of per-antenna information;
      a communication transceiver configured to transfer the plurality of per-antenna information to the BTS; and
      a processing system coupled to the storage system and the communication transceiver, with the processing system configured to receive the plurality of RF digitized antenna signals from the plurality of A/D converters, reverse-process the plurality of RF digitized antenna signals to generate the plurality of per-antenna information, and feed the plurality of per-antenna information to the BTS, with the BTS using the plurality of per-antenna information to monitor the plurality of antenna sub-systems.

2. The antenna monitoring system of claim 1, with the per-antenna information being used to determine a received signal power of signals received in each antenna sub-system of the plurality of antenna sub-systems.

3. The antenna monitoring system of claim 1, with the per-antenna information being used to determine a signal-to-noise (S/N) ratio of signals received in each antenna sub-system of the plurality of antenna sub-systems.

4. The antenna monitoring system of claim 1, with the per-antenna information being used to control an emitted signal power at each antenna sub-system of the plurality of antenna sub-systems.

5. The antenna monitoring system of claim 1, with the per-antenna information being used to detect a fault in an antenna sub-system of the plurality of antenna sub-systems.

6. The antenna monitoring system of claim 1, with the per-antenna information being used to detect that each antenna sub-system is receiving signals from a Remote Radio Unit (RRU) coupled to the distributed antenna system and to the BTS.

7. The antenna monitoring system of claim 1, with the per-antenna information being used to detect that each antenna sub-system is receiving signals from a corresponding building level of a multi-level building.

8. The antenna monitoring system of claim 1, with the per-antenna information being used to detect cross-talk in an antenna sub-system from other antenna sub-systems in other levels of a multi-level building.

9. The antenna monitoring system of claim 1, with the per-antenna information being used to monitor a traffic level in an antenna sub-system of the plurality of antenna sub-systems.

10. An antenna monitoring method configured to monitor a distributed antenna system, comprising:
    tapping an antenna signal at each antenna sub-system of a plurality of antenna sub-systems comprising the distributed antenna system to generate a plurality of tapped Radio Frequency (RF) antenna signals;
    digitizing the plurality of tapped RF antenna signals to generate a plurality of RF digitized antenna signals from the plurality of A/D converters;
    reverse-processing the plurality of RF digitized antenna signals to generate a plurality of per-antenna information; and
    feeding the plurality of per-antenna information to the distributed antenna system, with the distributed antenna system using the plurality of per-antenna information to monitor the plurality of antenna sub-systems.

11. The method of claim 10, with the per-antenna information being used to determine a received signal power of signals received in each antenna sub-system of the plurality of antenna sub-systems.

12. The method of claim 10, with the per-antenna information being used to determine a signal-to-noise (S/N) ratio of signals received in each antenna sub-system of the plurality of antenna sub-systems.

13. The method of claim 10, with the per-antenna information being used to control an emitted signal power at each antenna sub-system of the plurality of antenna sub-systems.

14. The method of claim 10, with the per-antenna information being used to detect a fault in an antenna sub-system of the plurality of antenna sub-systems.

15. The method of claim 10, with the per-antenna information being used to detect that each antenna sub-system is receiving signals from a Remote Radio Unit (RRU) coupled to the distributed antenna system.

16. The method of claim 10, with the per-antenna information being used to detect that each antenna sub-system is receiving signals from a corresponding building level of a multi-level building.

17. The method of claim 10, with the per-antenna information being used to detect cross-talk in an antenna sub-system from other antenna sub-systems in other levels of a multi-level building.

18. The method of claim 10, with the per-antenna information being used to monitor a traffic level in an antenna sub-system of the plurality of antenna sub-systems.

19. The method of claim 10, with the plurality of per-antenna information being fed back to a Base Transceiver Station (BTS) of the distributed antenna system.

20. One or more non-transitory computer-readable storage media having program instructions stored thereon for monitoring a distributed antenna system that, when executed by a processing system, direct the processing system to at least:
  receive a plurality of Radio Frequency (RF) digitized antenna signals from a plurality of analog-to-digital (A/D) converters;
  reverse-process the plurality of RF digitized antenna signals to generate a plurality of per-antenna information; and
  feed the plurality of per-antenna information to the BTS, with the BTS using the plurality of per-antenna information to monitor the plurality of antenna sub-systems.

* * * * *